United States Patent [19]

Kazakova et al.

[11] 4,042,411
[45] Aug. 16, 1977

[54] METHOD OF PROCESSING FOOD PARAFFINS AND USES OF OBTAINED PRODUCTS

[76] Inventors: Ljudmila Petrovna Kazakova, ulitsa Butlerova, 20, kv. 277; Alexei Alexandrovich Gundyrev, Leninsky prospekt, 69, korpus 2, kv. 280, both of Moscow; Nina Yakovlevna Rudakova, ulitsa Krylova, 22, kv. 10, Lvov; Fridrikh-Leopold Khaskelevich Sharf, ulitsa Zhupnaya, 11, kv. 3; Yaroslav Evstavievich Garun, ulitsa Zhupnaya, 27, both of Drogobych Lvovskoi oblasti; Lidia Ivanovna Belyashina, ulitsa Nagornaya, 33, korpus 22, kv. 52, Moscow; Zoya Vasilievna Kocheva, ulitsa Gogolya, 1, kv. 30, Drogobych Lvovskoi oblasti, all of U.S.S.R.

[21] Appl. No.: 570,424

[22] Filed: Apr. 22, 1975

[51] Int. Cl.$^2$ .............................................. C08L 91/08
[52] U.S. Cl. ...................................... 106/270; 208/25
[58] Field of Search ..................... 106/270.27; 208/25; 210/45

[56] References Cited

U.S. PATENT DOCUMENTS

| | | | |
|---|---|---|---|
| 2,967,817 | 6/1961 | Marple | 208/21 |
| 3,847,791 | 11/1974 | Kunert | 208/25 |

*Primary Examiner*—Theodore Morris
*Attorney, Agent, or Firm*—Steinberg & Blake

[57] ABSTRACT

Food paraffins are processed into a mixture of paraffins of normal structure, iso-structure, and naphthenes with side chains of normal and iso-structure, containing from 20 to 32 carbon atoms, and high-melting paraffins of normal structure, by processing the food paraffin at a temperature of 42°–45° C with carbamide taken in the weight ratio of 1:1, in the presence of a solvent consisting of 60 per cent by volume of benzine and 40 per cent by volume of acetone taken in the paraffin:solvent ratio of 1:3–3.5. The resultant reaction mixture consists of a crystalline mass containing high-melting paraffins of normal structure in the form of their complex with carbamide and a solution of a mixture of paraffins of normal structure, iso-structure, and naphthenes with side chains of normal and iso-structure having from 20 to 32 carbon atoms, in said solvent. The crystalline mass and the solution are separated. The solution of the mixture is washed with water at a temperature of 80°–90° C and then water and the solvent are removed by distillation to isolate said mixture. The crystalline mass is treated with water at a temperature of 80°–90° C to prepare an aqueous solution of carbamide and a solution of high-melting paraffins of normal structure in said solvent. These solutions are separated and the solvent is distilled from the solution of high-melting paraffins of normal structure.

The mixture of paraffins of normal structure, iso-structure, and naphthenes with side chains of normal and iso-structure, containing from 20 to 32 carbon atoms, obtained by this method, is used as an additive to protective coatings for tin containers intended for canning.

2 Claims, No Drawings

METHOD OF PROCESSING FOOD PARAFFINS AND USES OF OBTAINED PRODUCTS

This invention relates to methods of processing food paraffins, and more particularly it relates to methods of processing food paraffins into a mixture of paraffins of normal structure, iso-structure, and naphthenes with side chains of normal and iso-structure, containing from 20 to 32 carbon atoms, and high-melting paraffins of normal structure, and to uses of the obtained products.

Said mixture is used as an additive to protective coatings for tin containers intended for canning.

The additive gives mechanical strength, elasticity, and hence integrity to the protective coats. Moreover, the additive improves the anti-corrosion properties of the coatings.

Said high-melting paraffins of normal structure are high-quality raw materials used for preparing alcohol and synthetic fatty acids. They are also used in the food industry in the manufacture of containers and packaging materials and also in the manufacture of cheese.

At present no methods are known for processing food paraffins into said mixture of high-melting paraffins of normal structure.

The object of this invention is to provide such a method.

According to the invention the object is attained by the provision of a method of processing food paraffins, consisting in that food paraffin is processed at a temperature of 42°–45° C with carbamide taken in the weight ratio of 1:1, in the presence of a solvent consisting of 60 percent by volume of benzine and 40 percent by volume of acetone, the paraffin:solvent ratio being 1:3–3,5, with the formation of a reaction mixture consisting of a crystalline mass containing high-melting paraffins of normal structure, in the form of their complex with carbamide, and a solution of a mixture of paraffins of normal structure, iso-structure, and naphthenes with side chains of normal and iso-structure, containing from 20 to 32 carbon atoms, in said solvent; said crystalline mass is separated from the solution of the mixture; the solution of the mixture is washed with water at a temperature of 80°–90° C, and the solvent and water are then distilled off; said crystalline mass is treated with water at a temperature of 80°–90° C with the formation of an aqueous solution of carbamide and a solution of high-melting paraffins of normal structure in said solvent; these solutions are separated and the solvent is removed from the solution of high-melting paraffins by distillation.

Food paraffin used in the present invention has a melting point not lower than 52° C; it contains oil in the quantity of not more than 0.9 percent by weight, its colour is at least 250 mm (as determined colorimetrically); it is free from 3,4-benzpyrene, water-soluble acids or alkalies, from sulphates, chlorides, water, and mechanical admixtures.

In the treatment of this paraffin with carbamide, in the presence of said solvent in the selected conditions, the high-melting paraffins of normal structure, constituting a part of food paraffin, form a complex with carbamide. The complexing process largely depends on the process conditions, namely, on the temperature at which paraffin is processed with carbamide, and also on the weight ratio of paraffin to the solvent.

Hydrocarbons contained in food paraffin, that do not form complex with carbamide, are a mixture of paraffins of normal structure, iso-structure, and naphthenes with side chains of normal and iso-structure, containing from 20 to 32 carbon atoms.

Paraffins of normal structure, that are part of the mixture, have a lower molecular weight than the high-melting paraffins of normal structure that form the complex with carbamide.

The characteristics of hydrocarbons, that do not form such complex, their yields depending on the temperature of processing food paraffin with carbamide, and the weight ratio of food paraffin to the solvent are given in Table 1.

Table 1

| Hydrocarbons that do not form complex, Experiment No. | M.p.,° C | Specific dispersion, δF,C | Surface tension, $\sigma_{70}$ erg/cm² | Contact angle $\phi°$ | Yield %(w/w) | Process temperature, ° C | Weight ratio of paraffin to solvent |
|---|---|---|---|---|---|---|---|
| 1 | 52.5 | 93.8 | 24.8 | 4.5 | 65 | 52–54 | 1 : 2 |
| 2 | 52 | 94.3 | 25.62 | 6.5 | 58 | 42–45 | 1 : 3–3,5 |
| 3 | 49 | 95.6 | 27.8 | 9.4 | 20 | 36–38 | 1 : 5 |
| 4 | 48.5 | 96.8 | 28.0 | 9.7 | 19 | 32.34 | 1 : 8 |

If the weight ratio of food paraffin to the solvent is 1:2, the process temperature of 52°–54° C is too high, since it is close to the boiling point of acetone. Lowering temperature would provoke crystallization of hydrocarbons that do not form the complex.

If the weight ratio of paraffin to the solvent is 1:5 and 1:8, the yield of hydrocarbons that do not form the complex, is not sufficiently high, and, what is especially important, the results of the tests of the obtained products in lacquers and enamels, are negative.

The product obtained with the ratio of paraffin to the solvent of 1:3–3.5, and at the process temperature of 42°–45° C, gave positive results when tested in lacquers and enamels. Hydrocarbons that do not form the complex, obtained under these conditions, constitute just the desired additive.

In order to recover carbamide from the aqueous solution of carbamide, water is evaporated and carbamide is crystallized. Carbamide thus recovered is used at the stage of processing food paraffin with carbamide.

According to the invention, the mixture of paraffins of normal structure, iso-structure, and naphthenes with side chains of normal and iso-structure, containing 20 and 32 carbon atoms, obtained by the described method, is used as additive to protective coatings for canning tin containers.

The additive obtained by the proposed method meets the requirements of materials for such applications.

The additive is readily soluble in xylene, compatible with the basic compound of the coating, and gives it elasticity, and high tin-adhesive properties. Moreover, the additive ensures corrosion resistance of the coating under the conditions of prolonged storage (to 6 months) of various foods, including crab-meat, which is noted for high corrosive properties. The obtained additive is free from cancerogenic substances.

Enamel coating containing the proposed additive was tested under industrial conditions and the results were compared with those obtained under the same conditions with the additive produced by the Japanese firm "Mitsui Fuller". The comparative data are given in Table 2.

of normal structure, iso-structure, and naphthenes with side chains of normal and iso-structure, containing from 20 to 32 carbon atoms, in said solution, which is actually the solution of said additive.

Table 2

| Nos. | Coating | Mechanical strength of coating with pressed containers | | Stability toward model solvents during sterilization | | |
|---|---|---|---|---|---|---|
| | | assembled tin | cover to container | to protein fluids | to 3% salt solution | to distilled water |
| 1. | Enamel with additive. Enamel is a mixture of zinc-paste on dehydrated castor oil, intermediate product on phenol-formaldehyde and maleinized tung oil and linseed oil basis, and turpentine | no change | well pressed even without lubrication | no change | no change | no change |
| 2. | Japanese enamel 61-C-2022 "Mitsui-Fuller" Company | no change | well pressed with lubrication; damaged coating when pressed without lubrication | no change | no change | no change |
| 3. | Enamel, pentaerythritol oil varnish and additive. The enamel is a mixture consisting of zinc-paste on dehydrated castor oil, intermediate product on phenol-formaldehyde resin and maleinized tung oil and linseed oil basis, and turpentine. Lacquer for additional lacquering | no change uneven coating | even coating uneven coating; inadequate appearance | no change | no change | no change |
| 4. | Enamel of Japanese company "Mitsui-Fuller"for additional lacquering | | | | | |

The comparison shows that the enamel containing the additive obtained by the proposed method has better mechanical properties than enamel 61-C-2022 produced by the "Mutsui-Fuller" Company.

High-melting paraffins of normal structure obtained by the proposed method do not contain cancerogenic substances, have no odour, and their yield is 42 percent.

For a better unnderstanding of the invention, the following example of its practical embodiment is given by way of illustration.

The starting substance, food paraffin, is heated to 70° C and pumped into a vessel provided with a heater. Benzine (60percent by volume) and acetone (40 percent by volume) are batched by pumps and passed through a diaphragm mixer into another vessel. The thus obtained solvent and paraffin are then batched in the paraffin to a solvent ratio of 1:3–3.5 and fed by gravity into a mixer where paraffin is dissolved in the solvent at a temperature of 42°–45° C. The obtained solution is then delivered into a reactor, into which fresh and recovered carbamide are automatically pumped, the ratio of paraffin to carbamide being 1:1 (by weight). The complexation reaction continues for thirty minutes at a temperature of 42°–45° C. The obtained reaction mixture consists of a crystalline mass containing high-melting paraffins of normal structure in the form of their complex with carbamide, and a solution of a mixture of paraffin The reaction mixture is delivered by means of a screw pump into a feeding vessel of a vacuum filter, provided with a mechanical stirrer. From the vessel the reaction mixture flows by gravity into the vacuum filter, where the crystalline mass is separated from said solution. The solution of the mixture is delivered into a mixer, where it is washed with water at a temperature of 80°–90° C, after which the solvent and water are distilled off at a temperature of 100° C and a pressure of 0.5 atm. The ready additive is discharged from the column bottom and packed. Said crystalline mass is delivered into an apparatus where the formed complex is decomposed. The apparatus is provided with a stirrer and a heating water jacket. The complex is decomposed with water at a temperature of 80°–90° C. As a result, an aqueous solution of carbamide and a solution of high-melting paraffins of normal structure in said solvent are obtained, which are then separated.

The aqueous solution of carbamide is recovered by evaporating water from it with the obtaining of crystalline carbamide which is returned to the stage treating food paraffin. The solution of high-melting paraffins of normal structure is delivered into a stripping column where the solvent is removed at a temperature of 150° C.

The characteristics of the starting paraffin and the obtained products are given in Table 3.

Table 3

| Product | M.p.° C | Density $\rho_4^{70}$ g/cc | Refractive index, $n_D^{70}$ | Sp. dispersion, $\delta F, C$ | Surface tension, $\sigma 70$, erg/cm$^2$ | Contact angle $\phi°$ | Adhesion work, $W_a$ erg/cm$^2$ | Symmetry factor $S_w$ |
|---|---|---|---|---|---|---|---|---|
| Food paraffin | 53 | 0.7729 | 1.4321 | 91.3 | 25.61 | 4 | 51.16 | +3.1 |
| Additive | 52 | 0.7730 | 1.4322 | 94.3 | 25.62 | 6.5 | 51.07 | +4.7 |
| High-melting paraffins of normal structure | 57 | 0.7728 | 1.4320 | 93.2 | 25.49 | 3.5 | 50.93 | +0.2 |

Table 4

| | Hydrocarbon Composition of Additive | | | | | | | | | | | | |
|---|---|---|---|---|---|---|---|---|---|---|---|---|---|
| Number of carbon atoms | $C_{20}$ | $C_{21}$ | $C_{22}$ | $C_{23}$ | $C_{24}$ | $C_{25}$ | $C_{26}$ | $C_{27}$ | $C_{28}$ | $C_{29}$ | $C_{30}$ | $C_{31}$ | $C_{32}$ |
| % of total content | 1.2 | 2.6 | 5.7 | 9.3 | 12.7 | 14.2 | 12.3 | 11.6 | 9.2 | 7.6 | 5.7 | 4.4 | 3.5 |

Table 5

| | Composition of High-Melting Paraffins of Normal Structure | | | | | | | | | | | | |
|---|---|---|---|---|---|---|---|---|---|---|---|---|---|
| Number of carbon atoms | $C_{22}$ | $C_{23}$ | $C_{24}$ | $C_{25}$ | $C_{26}$ | $C_{27}$ | $C_{28}$ | $C_{29}$ | $C_{30}$ | $C_{31}$ | $C_{32}$ | $C_{33}$ | $C_{34}$ |
| % of total content | 0.2 | 1.2 | 3.5 | 7.3 | 8.7 | 11.8 | 12.9 | 13.9 | 12.6 | 11.1 | 8.2 | 6.0 | 2.6 |

The analysis data given in Tables 4 and 5 were obtained by the gas-liquid chromatography method.

We claim:

1. A method of processing food paraffins into a mixture of paraffins of normal structure, iso-structure, and naphthenes with side chains of normal structure and iso-structure, containing from 20 to 32 carbon atoms, and high-melting paraffins of normal structure, which comprises reacting a food paraffin at a temperature of 42°–45° C with carbamide taken in the weight ratio of 1.1, in the presence of a solvent consisting of 60 percent by volume of benzine and 40 percent by volume of acetone, taken in the paraffin:solvent weight ratio of 1:3–3.5, thus forming a reaction mixture consisting of a crystalline mass containing high-melting paraffins of normal structure in the form of their complex with carbamide, and of a solution of a mixture of paraffins of normal structure, iso-structure, and naphthenes with side chains of normal and iso-structure, containing from 20 to 32 carbon atoms, in said solvent; separating said crystalline mass and the solution of said mixture; washing the solution of said mixture with water at a temperature of 80°–90° C and removing the solvent and water by distillation, the thus obtained mixture of paraffins of normal structure, iso-structure and naphthenes with side chains of normal and iso-structure being useful as an additive to protective coatings for canning tins; mixing said crystalline mass with water at a temperature of 80°–90° C to form an aqueous solution of carbamide and a solution of high-melting paraffins of normal structure, in said solvent; separating said solutions, and removing the solvent from the solution of high-melting paraffins of normal stucture by distillation.

2. A method according to claim 1, in which water is evaporated from the aqueous solution of carbamide to obtain crystalline carbamide which is used to process additional food paraffin.

* * * * *